United States Patent

[11] 3,630,289

| [72] | Inventor | Ake Wilhelm Norberg<br>Valhallavagen 49, 114 22, Stockholm, Sweden |
|------|----------|---|
| [21] | Appl. No. | 879,875 |
| [22] | Filed | Nov. 25, 1969 |
| [45] | Patented | Dec. 28, 1971 |
| [32] | Priority | Dec. 9, 1968 |
| [33] | | Sweden |
| [31] | | 16822/68 |

[54] METHOD OF PROVIDING AND APPLYING A HORSESHOE AND HORSESHOE PROVIDED AND APPLIED IN ACCORDANCE WITH SAID METHOD
10 Claims, 1 Drawing Fig.

| [52] | U.S. Cl. | 168/28 |
|------|----------|--------|
| [51] | Int. Cl. | A01l 07/02 |
| [50] | Field of Search | 168/4, 18, 26, 28, 12–17 |

[56] References Cited
UNITED STATES PATENTS

| 226,848 | 4/1880 | Grece | 168/28 |
|---------|--------|-------|--------|
| 633,796 | 9/1899 | Bush | 168/26 |
| 2,041,538 | 5/1936 | Gash et al. | 168/4 |
| 3,236,310 | 2/1966 | Quick | 168/18 |
| 3,285,346 | 11/1966 | Jenny et al. | 168/4 |

FOREIGN PATENTS

| 329,765 | 5/1930 | Great Britain | 168/28 |

*Primary Examiner*—Hugh R. Chamblee
*Attorney*—Larson, Taylor and Hinds

ABSTRACT: A padded horseshoe comprising a polymeric hoof pad completely filling the cavities between the frog and the horn wall underneath a horse hoof and a wear shoe, said horseshoe nailed to said hoof.

PATENTED DEC 28 1971 3,630,289
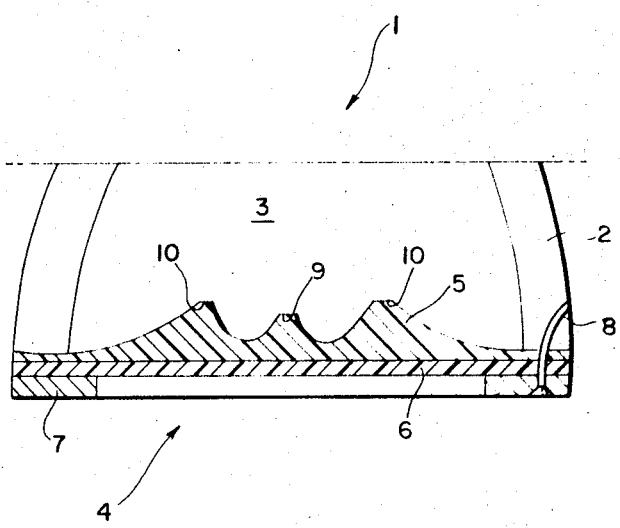
INVENTOR
AKE W. NORBERG
BY Larson and Taylor
ATTORNEYS

METHOD OF PROVIDING AND APPLYING A HORSESHOE AND HORSESHOE PROVIDED AND APPLIED IN ACCORDANCE WITH SAID METHOD

The present invention refers to a method of providing a horseshoe including more parts and applying same to a horse's hoof, and the invention further refers to a horseshoe provided and applied in accordance with said method.

For various reasons it must be considered absolutely necessary to furnish a horse's hoof with an extra wear surface in the form of a shoe of a material of high resistance and wear. Such horseshoes used to be formed as a rearwardly open hoop, its shape and size corresponding to the outer periphery of the hoof and having a horizontal width corresponding to or somewhat exceeding the part of the horny section of the hoof, against which the shoe is intended to be attached. The shoe will thus support only the horny section of the hoof, and due to the vertical thickness of the shoe the hoof frog will under normal conditions never rest against the ground.

In the natural, nonshoed state of the horse, the frog thereabout with a substantial part of its surface supports against the ground, and the hoof due therefore gets an essential greater supporting surface than is the case a shoed hoof. The natural, nonshoed state of the horse is for various physiological reasons preferred to the shoed state. As mentioned, the nonshoed hoof has a greater surface supporting against the ground and the risk of load injury of an especially exposed part of the hoof is thereby reduced. Further, due to its fleshy constitution and its special form traversed by frog furrows, the hoof frog has some shock-absorbing power, which to a great extent reduces the risk of shock injuries of muscles, joints and the like, which may occur when the horse for long periods tramps on hard ground as for instance of stone, asphalt and the like. Further since the hoof frog is sentient it will to a greater extent than in the case of a shoed hoof cause the horse to feel where and how the hoof is being put down, and this will essentially reduce the risk of the frequently occuring fault steps and injuries which may arise therefrom.

It should consequently involve great advantages if the hoof frog might be given a possibility of taking up a part of the hoof load, and the hoof should thereby regain its natural, physiologically advantageous function. With regard to the great wear and tear to which the hoof should be subjected and to the risk of hurting the frog against existing hard paving or the like it must be considered fully objectional to use unshoed horses.

A need has therefore existed of a horseshoe of a shoe composition so formed that the hoof frog will take up an essential part of the total load of the hoof however without its natural form thereby being essentially changed, and said shoe having a wear surface formed as a conventional horseshoe, and at which shoe the hoof frog is given the possibility of regaining its natural function, whereby the disadvantages related to horseshoes might be eliminated.

The present invention is intended to meet the above mentioned need by means of a horseshoe and the method of applying same to a horse's hoof according to the invention. Further characteristics of the invention will be evident from the following detailed description and from the appended claims. It is, however, to be understood that the embodiments of the invention showed and described are to be looked upon as illustrative examples and that the invention should not be limited thereby.

In the following detailed description will be referred to the accompanied drawing, which schematically shows a vertical cross section seen from behind through a part of a horse's hoof with a horseshoe according to the invention applied thereto.

In the drawing is illustrated a portion of a hoof 1 having horn wall 2 and frog 3, onto which hoof a shoe 4 according to the invention is applied. The shoe comprises a hoof pad 5, an intermediate sole 6 and a wear shoe 7 which by means of nails 8 is attached to the horn wall 2 of the hoof.

The essential feature of the invention is the application of the hoof pad 5, which is intended to fill the cavity existing between the frog and the horizontal plane through the underedges of the horn wall 2. The hoof pad 5 serves the purpose of receiving and transferring a part of the pressure on the hoof when loaded to the frog, whereby the frog will regain its natural pressure-receiving, dampening and cushioning function. As discussed above this implies several physiological advantages and to a great extent eliminates the disadvantages which will necessarily be obtained due to the fact that the hoof must be provided with a wear shoe of the conventional kind shown in the drawing. A hoof pad suited for this purpose must possess several special characteristics, and the choice of material for the hoof pad is consequently of very great importance. Firstly the hoof pad must be made of a material, which may be molded directly into the actual cavity so as to completely fill the central furrow 9 and the side furrows 10 of the frog 3 and so as to fill all other unevenesses and spaces of the actual cavity. The material of the hoof pad should further be of such a kind that it, after having been molded, takes its final state without shrinkening or swelling, without emitting gas, vapor or the like, and especially without heat having to be supplied, i.e. that the material shall be able to be transformed into its final state at the normal room temperature at which the farrier work takes place. Further the pad material should be elastic, and the degree of elasticity is, as will be explained below, of very great importance to a good function of the hoof. The material also has to be substantially independent to normally existing temperatures as for instance from −40° to +50° C. i.e. that the qualities of the material must not noticeably be changed within the temperature interval mentioned. Finally the material must also be substantially indifferent to all kinds of acids and bases to which the horseshoe might be exposed.

The hoof pad should thus be able to be directly molded in the actual cavity of the hoof, so that this will be completely filled out, and said molding must be able to take place without raised temperature since the horse would otherwise be irritated due to the heat and the frog and/or the horn wall might at worst be hurt. Since the pad material will as mentioned completely fill the actual cavity of the hoof it is of greatest importance that the material does neither shrimp nor swell at the setting thereof, since the frog might get pinched and due thereto be irritated or the pad might be too small and get loose, which might irritate the horse. Before the material has taken its final state, the intermediate sole 6 is applied to the hoof and the wear shoe 7 is nailed, and it is consequently of importance that the material of the hoof pad will not emit any gases at its setting since gas cushions might thereby arise between the hoof pad 5 and the intermediate sole 6, which would be difficult to remove, and the risk should also exist that undesired gas formation might arise at the inside of the pad, i.e. between the pad 5 and the frog 3.

The elasticity of the material should be so chosen that the pad should both be able to receive and distribute the contact pressure of the hoof to the whole of the load surface of the hoof, and make a natural compression and expansion of the frog possible, so that said frog will except for receiving the hoof load also regain its natural damping and cushioning effect. In this respect it has been found that a material having an ultimate strength of about 75–200 kg./cm.² and an elongation to break of 100–600 percent is suitable for this purpose, and the ideal material is supposed to be a material which to its character as closely as possible corresponds to that of the frog. Such an ideal material should have an ultimate strength of about 100–125 kg./cm.² and an elongation to break of about 200–300 percent.

Materials having the above mentioned qualities, i.e. materials being moldable in cold state, which will set in cold state, which have a given elasticity which are substantially indifferent to temperatures within a given temperature interval and which are resistant to common acids and bases have been found to be material of the group of elastomers including polysiloxanes, polymercaptanes or softened polyether resins. The materials of interest should thereby have a rigidity of about 20–40 Shore. Said materials can be stored for a long time and in connection with applying same to the hoof they are mixed up with a hardener, an accelerator or other components, whereby that may be brought to polymerize at any suitable temperature.

When the material of the hoof pad has been molded in the cavity between the frog and the underedges of the horn wall so that the hoof has been given an even compact surface, it is covered with an intermediate sole before the material of the hoof pad has polymerized, which intermediate sole can be made of any suitable material, but which in a preferred embodiment consists of a plate of polyethylene having a thickness of about 4 mm. A certain bond will thereby arise between the hoof pad and the intermediate sole which can be of importance for the contact pressure of the hoof being transferred to the frog.

The wear shoe 7 can be a conventional steel shoe, but any other kind of shoe may be used, for instance a shoe of synthetic resin, light metal or the like, and the wear shoe can of course be given any suitable horizontal width, and a wear shoe can also be used which more or less completely covers the underside of the hoof.

At the application of the shoe to a hoof one will act in the following way. The material for the hoof pad, which is delivered as at least two units, that is the elastomeric material and a hardener, is mixed just before the molding thereof into the underside cavity of the hoof, whereupon the material be means of a spatula or any similar tool is distributed, so that it is depressed into all cavities of the hoof and so that it is given an even surface in alignment with the underside of the horn wall 2. It might perhaps be suitable to distribute the material for the hoof pad so that it will also cover the horny section of the hoof with a thickness of the layer of about 2 to 3 mm. In immediate connection thereto and before the hoof pad material has polymerized to an obvious degree, the underside of the hoof is covered with an intermediate sole and thereupon with the wear shoe which is in the conventional manner attached to the hoof by means of nails. The mails will consequently extend through the wear shoe 7 as well as the intermediate sole 6 and perhaps also through a part of the hoof pad 5, so that the intermediate sole 6 and the hoof pad 5 will be fixed to the hoof. Trimming of the hoof of course takes place in a conventional way.

I claim:
1. A method of shoeing a horse comprising the steps of introducing a shapeable polymerizable composition comprising a hardener and a polymerizable material capable of being polymerized to a polymer within the cavities between the frog and the horn wall underneath a horse hoof;

pressing the surface of said shapeable composition to completely fill in said cavities therewith;

flattening the surface of said composition to provide a plane surface at the underside of said hoof;

nailing a wear shoe to said hoof, and permitting said composition to polymerize to form a polymer within the cavities of said hoof to provide a hoof pad therein which completely fills said cavities.

2. A method according to claim 1 wherein said plane surface extends over the under surface of said horn and wherein an intermediate sole is interposed between said surface and said wear shoe.

3. A method according to claim 2 wherein said intermediate sole comprises material selected from the group consisting of leather and plastic.

4. A method according to claim 1 wherein said polymer has an ultimate tensile strength of 75–200 kg./cm.$^2$, an elongation to break of 100–600 percent and a shoe hardness of 20–40.

5. A method according to claim 1 wherein said polymerizable material is polymerizable at room temperature.

6. A method according to claim 1 wherein said polymer is selected from the group consisting of polysiloxanes, polymercaptans, and polyethers.

7. A padded horseshoe comprising a polymeric hoof pad completely filling the cavities between the frog and the horn wall underneath a horse hoof and a wear shoe, said horseshoe being nailed to said hoof.

8. A padded horseshoe according to claim 7 further including an intermediate sole interposed between said polymer and said wear shoe.

9. A padded horseshoe according to claim 7 wherein said polymer has an ultimate tensile strength of 75–200kg./cm.$^2$, an elongation at break of 100–600 percent, and a shoe hardness of 20–40.

10. A padded horseshoe according to claim 9 wherein said polymer is selected from the group consisting of polysiloxanes, polymercaptans, and polyethers.

* * * * *